UNITED STATES PATENT OFFICE 1,968,820

MANUFACTURE OF THE AMMONIUM SALT OF THE UREA OF M-AMINO-BENZOYL-M-AMINO-P-TOLUYL-1-NAPHTHYLAMINE-4:6:8-TRISULPHONIC ACID

George Malcolm Dyson, Cheadle Hulme, and Arnold Renshaw, Manchester, England, assignors to Parke, Davis and Company, Detroit, Mich., a corporation of Michigan No Drawing. Application January 16, 1929, Serial No. 333,019

6 Claims. (Cl. 260—125)

There is on the market a drug known as "Bayer No. 205" which has very considerable therapeutic value in combating diseases contracted through trypanosomes. A process for its manufacture is described in the Patent No. 1,218,665. In following the directions given in this patent, however, we have not been able to produce a product which approaches the usual activity of the "Bayer No. 205" now on the market.

We have, however, found a new process by which we produce a drug of greater activity than the said "Bayer No. 205" and even greater than that of the similar product known as "Fourneaux 309". We prepare our new product by chlorinating diphenylurea-m-m'-dicarboxylic acid so as to chlorinate both carboxy groups. This di-acid chloride is reacted with the amino body obtained by reducing the product of the interaction of m-nitro-p-toluyl chloride and a salt of 1-naphthylamine-4:6:8-trisulphonic acid. The solution of the reaction product may be evaporated to dryness in a vacuum, the product extracted with methyl alcohol and finally precipitated with ethyl alcohol. We may further purify the product by converting the salt into a lead salt. We can decompose the lead salt to get the free acid and then neutralize this with ammonia. We attribute importance in securing the greatest efficiency to our drug to the purification by this passage through the lead salt, and also we attribute importance to preparing the drug in the form of its salt with ammonia.

The chlorination of the diphenyl-urea-m-m'-dicarboxylic acid can be effected by treating the free acid or the sodium salt with a chlorinating agent, such as thionyl chloride, phosphoric pentachloride or phosphoric trichloride.

The condensation of the di-acid chloride with the above mentioned reduced reaction product may be effected in the presence of ammonium acetate or ammonium bicarbonate.

The following example will serve further to illustrate our new process:

Example 200 parts of diphenylurea-3:3'-dicarboxylic acid are mixed with thionyl chloride (240 parts) and the mixture heated gently until the acid has gone into solution almost completely. Any excess of the thionyl chloride is removed by distillation in vacuo. The gum which remains forms an intermediate product designated as the di-acid chloride of diphenylurea-m-m'-dicarboxylic acid having the following probable structural formula:

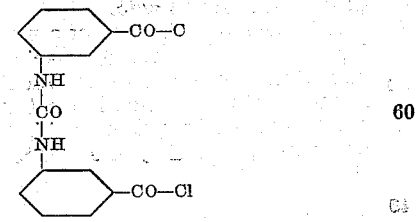

It is stirred with water (4000 parts), sodium acetate (300 parts) and 1140 parts of the sodium salt of m-amino-p-toluyl-1-naphthylamine-4:6:8-sulphonic acid having the following structural formula:

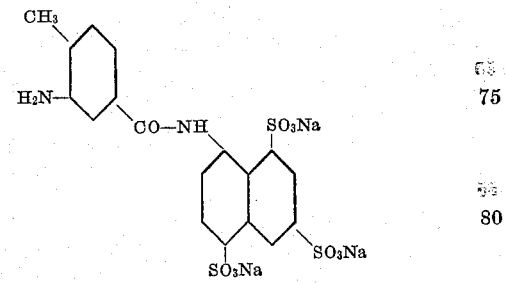

Stirring is continued until the solution gives only a faint diazo reaction on treating with nitrous acid and resorcinol. The filtered solution which probably contains the trisodium salt of the urea of m-amino-benzoyl-m-amino-p-toluyl-1-naphthylamine-4:6:8-trisulphonic acid is warmed to 60° C. and a solution of 1000 parts of lead acetate in 8000 parts of water containing 1% of ammonia added. The precipitate of lead salt is collected, washed with water, and treated with sulphuric acid until no further precipitate of lead sulphate is obtained. The solution is filtered from lead sulphate and exactly neutralized with ammonia and evaporated in a vacuum thereby obtaining as the final product the ammonium salt of the urea of m-amino-benzoyl-m-amino-p-toluyl-1-naphthylamine-4:6:8-trisulphonic acid which has the following probable structural formula:

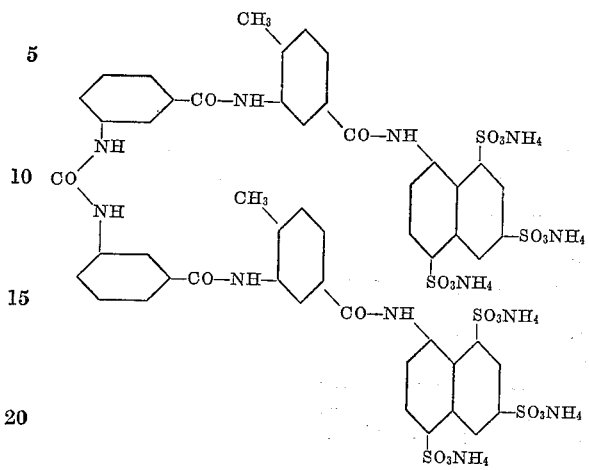

Although we have explained and illustrated our invention by means of this one example, it will be readily understood by chemists that equivalents may be used and equivalent products obtained.

What we claim and desire to secure by Letters Patent is:—

1. The ammonium salt of the urea of m-amino-benzoyl - m - amino - p - toluyl-1-naphthylamine-4:6:8-trisulphonic acid.

2. In the manufacture of a medicinal preparation by condensing the di-acid chloride of diphenyl urea -m-m'-dicarboxylic acid with the trisodium salt of m-amino-p-toluyl-1-naphthylamine-4:6:8-trisulphonic acid, the steps which comprise converting the condensation product into its insoluble lead salt, decomposing the lead salt with sulphuric acid and neutralizing the free acid with ammonia.

3. The process for the manufacture of a urea drug comprising the condensation of the di-acid chloride by diphenylurea-m-m'-dicarboxylic acid with m-amino-p-toluyl-1-naphthylamine-4:6:8-trisulphonates, precipitating the solution thus obtained with a soluble lead salt, treating the precipitate with sulphuric acid to remove lead sulphate, adding ammonia to the filtrate until neutral and evaporating under vacuum thereby obtaining the ammonium salt of the urea of m-amino-benzoyl - m - amino - p - toluyl - 1 - naphthylamine-4:6:8-trisulphonic acid.

4. The process for the manufacture of the urea of m-amino-benzoyl-m-amino-p-toluyl-1-naphthylamine-4:6:8-trisulphonic acid comprising the condensation of a salt of diphenylurea-m-m'-dicarboxylic acid with m-amino-p-toluyl-1-naphthylamine-4:6:8-trisulphonates.

5. The process for the manufacture of the urea of m-amino-benzoyl-m-amino-p-toluyl-1-naphthylamine-4:6:8-trisulphonic acid comprising the condensation of the di-acid chloride of diphenylurea-m-m'-dicarboxylic acid with m-amino-p-toluyl-1-naphthylamine-4:6:8-trisulphonates.

6. The process for the manufacture of a urea drug comprising the condensation of the di-acid chloride of diphenylurea-m-m'-dicarboxylic acid with the trisodium salt of m-amino-p-toluyl-1-naphthylamine-4:6:8-trisulphonic acid thereby obtaining the trisodium salt of the urea of m-amino-benzoyl - m - amino - p - toluyl - 1 - naphthylamine-4:6:8-trisulphonic acid.

GEORGE MALCOLM DYSON.
ARNOLD RENSHAW.